United States Patent [19]
Robinson et al.

[11] Patent Number: 5,153,558
[45] Date of Patent: Oct. 6, 1992

[54] VEHICLE SECURITY SYSTEM WITH BATTERY TAMPERING DETECTION

[75] Inventors: David A. Robinson, Livonia, Mich.; Curtis R. Balka, Kokomo, Ind.; Ronald H. Jaeger, Indianapolis, Ind.

[73] Assignee: Delco Electronics Corp., Kokomo, Ind.

[21] Appl. No.: 653,640

[22] Filed: Feb. 8, 1991

[51] Int. Cl.$^5$ .............................. B60R 25/10
[52] U.S. Cl. ........................ 340/428; 340/426; 340/455; 340/438; 180/279; 307/10.7
[58] Field of Search ........... 340/455, 426, 428, 425.5, 340/438, 439, 636; 307/9.1, 10.1, 10.2, 10.7; 364/424.03, 424.05; 180/279

[56] References Cited
U.S. PATENT DOCUMENTS 4,462,022  7/1984  Stolarczyk ..................... 340/539
4,887,064 12/1989  Drori ............................. 340/426
4,965,738 10/1990  Bauer ........................... 340/636

Primary Examiner—Jin F. Ng
Assistant Examiner—Christine K. Oda
Attorney, Agent, or Firm—A. Frank Duke

[57] ABSTRACT

A vehicle anti-theft system is equipped with a circuit to produce a pulse signal when a disconnected vehicle battery is reconnected, and a normally asleep microcomputer based controller is programmed to wake up upon receipt of the pulse signal or another detector signal, and to evaluate the status of each detector signal and the armed, disarmed and alarm state of the controller to sound an alarm, if appropriate, in response to the battery reconnect signal. The armed, disarmed or alarm state of the controller is stored in a non-volatile memory so that information will be kept indefinitely during power loss.

6 Claims, 2 Drawing Sheets

VEHICLE SECURITY SYSTEM WITH BATTERY TAMPERING DETECTION

FIELD O THE INVENTION

This invention relates to a vehicle anti-theft system and particularly to a method and apparatus to activate the system when the vehicle battery has been disconnected and then reconnected.

BACKGROUND OF THE INVENTION

Vehicle anti-theft systems commonly include several sensors on the vehicle which are coupled to an alarm controller to determine when an unauthorized intrusion of the vehicle interior occurs. A logical interpretation of the sensor states determines whether the alarm controller should be armed, disarmed, or should activate an alarm. The armed, disarmed or alarm status of the controller affects the interpretation of the sensor input and whether an alarm is actually sounded.

The most common way of defeating an alarm system is to disconnect the vehicle battery; then no power is available to energize an alarm. Further, when the battery is reconnected, the status of the controller will go to some default value unless some arrangement is made to store the status during the period of power loss. It is desirable that the previous alarm status be resumed when the battery is reconnected and that the fact of the battery reconnection be part of the controller information. In general, it is desirable the alarm be sounded when the battery is reconnected unless the alarm status was disarmed or a vehicle key is operative.

Several approaches to dealing with the battery disconnect problem have been proposed. One proposal is to use a low leakage capacitor to maintain power on the controller during battery power loss. This is effective for only short power loss periods, however. Another approach is to use a backup battery for the controller but that is an expensive solution. A temporary state storage may also be used but this also is limited status is remembered, the separate problem exists of detecting the reconnection of the battery.

SUMMARY OF THE INVENTION

It is therefore an object of the invention to provide a low cost vehicle security system with indefinite storage of system status and a determination of battery reconnection. Another object is to provide such a system which sets an alarm to indicate intrusion.

The invention is carried out by a vehicle anti-theft system for detecting unauthorized intrusion and battery reconnection comprising: alarm means; a vehicle battery; a circuit coupled to the battery for issuing a reconnect signal when a disconnected battery is reconnected; a plurality of vehicle status detectors on the vehicle each for producing a status output when a particular condition occurs; controller coupled to the said circuit and to the detectors for activation by any of the reconnect signal and the status outputs; and the controller including means for determining whether any status output is produced and means for energizing the alarm means when the controller is activated and no status output is produced, whereby an alarm is produced when the battery is reconnected.

The invention is further carried out in a vehicle security system including a controller having a sleep state and having a non-volatile memory, door status detectors, key status detectors, a battery circuit for producing a reconnect pulse when the battery has been disconnected and reconnected, and the controller coupled to the detectors and to the battery circuit for waking by a detector activation, by the method of setting an alarm state comprising the steps of: setting a disarmed flag, an armed flag or an alarm flag in non-volatile memory according to the status of the detectors; waking the controller by activating a detector; then assessing the states of the key detectors and reading the flag; and setting an alarm state when the armed flag is set and no key detector is activated, whereby the battery circuit alone is effective to wake the controller and cause the alarm state to be set.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
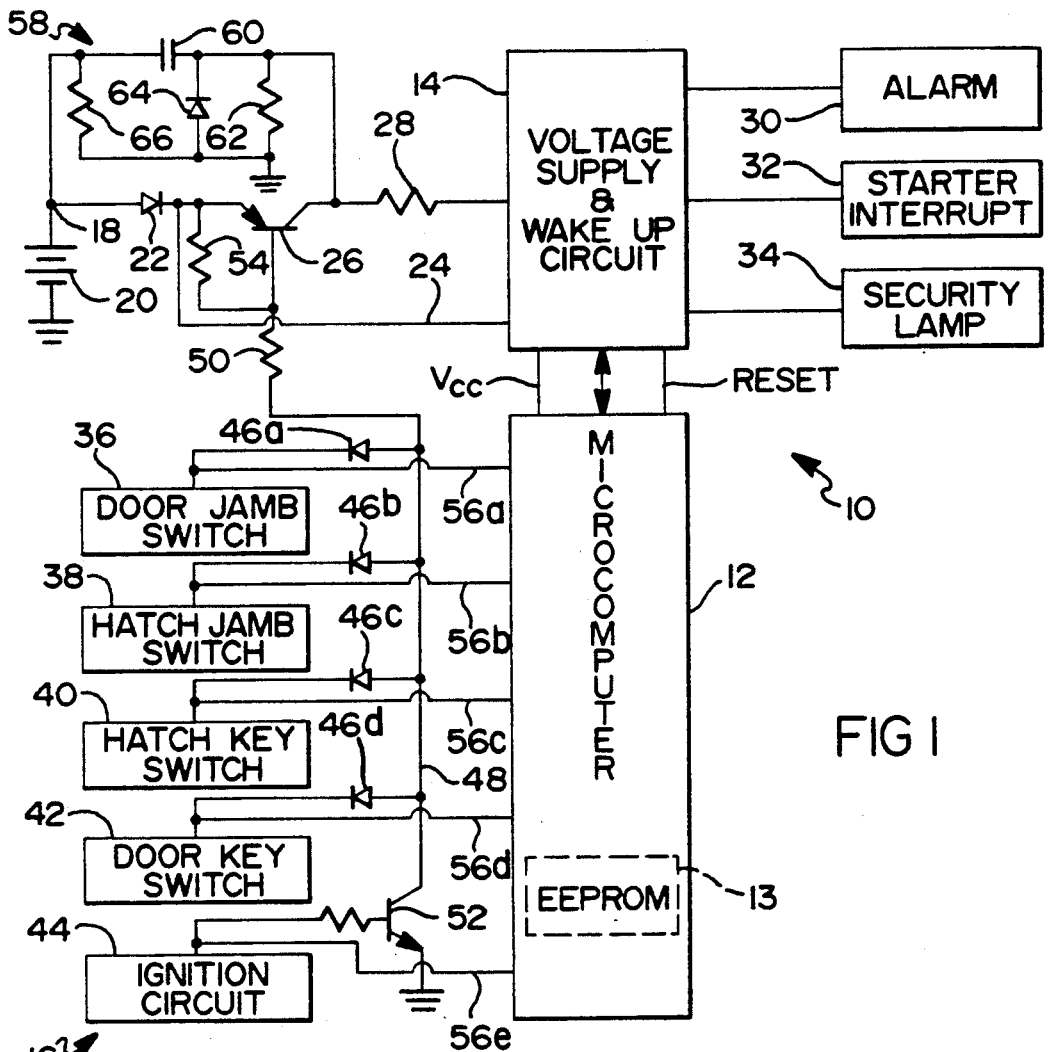
FIG. 1 is a schematic, diagram of a vehicle anti-theft system according to the invention.

Referring to FIG. 1, the vehicle security system is shown as comprising a controller 10 including a microcomputer 12 coupled to a voltage supply and wake-up circuit 14, a number of detectors 16 and circuitry connecting the controller 10 to the detectors 16 and to a terminal 18 of the vehicle battery 20. A commercially available microcomputer manufactured by Motorola, MC68HB05P8 is suitable and contains as part of its memory, non-volatile memory 13 in the form of an EEPROM. Battery voltage is connected through a diode 22 and supply line 24 to the voltage supply and wake-up circuit 14 and through the emitter and collector of a transistor 26 and resistor 28 to a wake-up input of the circuit 14. The circuit 14 supplies operating voltage $V_{cc}$ to the microcomputer and a reset signal to initiate software execution. System outputs controlled by the circuit 14 comprise an alarm 30, a starter interrupt circuit 32 for preventing vehicle starter operation, and a security lamp 34 which may be flashed to indicate an alarm mode. In one embodiment these three outputs are activated during the alarm mode and are effective to sound the vehicle horn, disable the starter and flash the vehicle headlamps.

The detectors 16 may include various sensors depending on the particular application. For illustration, a door jamb switch 36, a hatch jamb switch 38, and three key operated detectors, a hatch key switch 40, a door key switch 42 and an ignition circuit detector 44 are shown. Each of the switches 36-42 are coupled through diodes 46a-46d to line 48 which is connected through a resistor 50 to the base of the transistor 26. The switches effectively ground the line 48 when activated. The ignition circuit detector 44 is coupled to the base of a transistor 52 which has its emitter and collector serially connected between the line 48 and ground to ground the line 48 when the ignition circuit is on. A resistor 54 connects the emitter and base of the transistor 26 to normally hold the transistor off. However when any of the detectors 16 is activated to ground the line 48 the transistor 26 conducts to send a wake-up signal to the voltage supply and wake-up circuit 14. Each of the detectors 36-44 is a respectively connected by a line 56a-56e to the microcomputer 12.

A battery reconnect detection circuit 58 comprises a capacitor 60 coupled between the battery terminal 18 and the resistor 28, a resistor 62 and a diode 64 in parallel coupled between ground and the junction of capacitor 60 and resistor 28, and a resistor 66 connected between ground and the battery side of the capacitor 60. When the battery 20 is disconnected at the terminal 18, the resistor 66 assures that the capacitor 60 discharges to ground voltage. The diode 64 is poled to clamp the capacitor voltage to no less than one diode drop below ground potential. When the battery is reconnected at the terminal 18, the capacitor will be charged to pass a pulse sufficient to trigger a wake-up of the circuit 14. The time constant of the pulse is determined by the capacitor 60 and the resistor 62.

Figure 2:
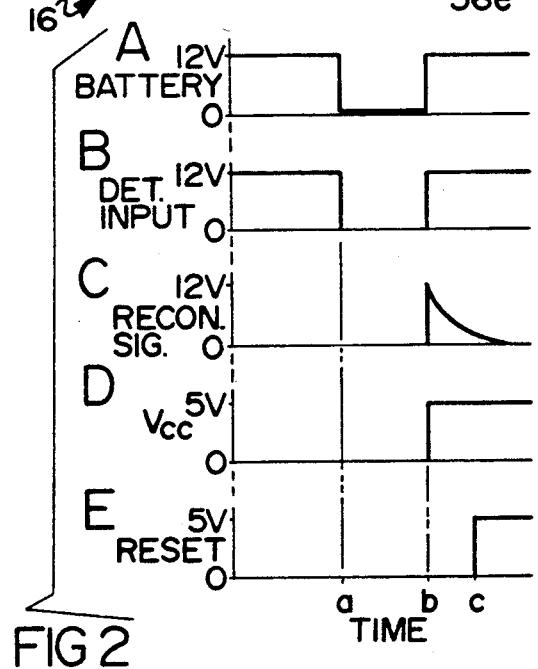
FIGS. 2 and 3 are graphs illustrating conditions of the system of FIG. 1 for two different operation modes.
Figure 3:
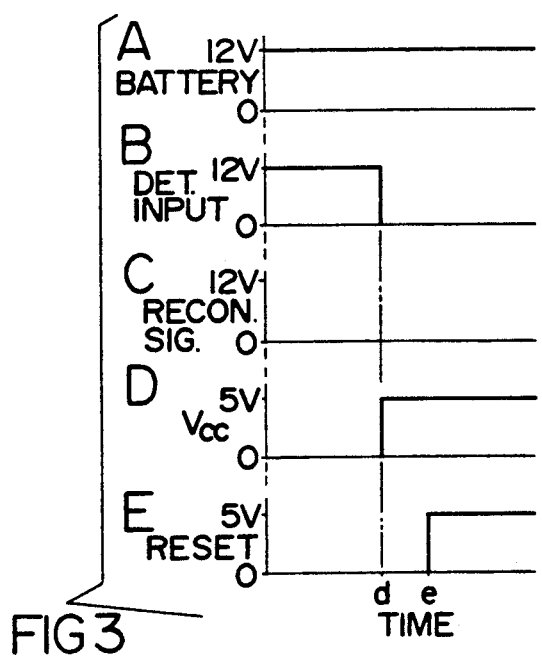

FIGS. 2 and 3 graphically illustrate the circuit operation for the cases of a circuit 14 awakening as a result of battery disconnection and reconnection and as a result of a detector 16 operation, respectively. In FIG. 2, graph A shows a hiatus in battery voltage due to battery disconnect at time a and reconnect at time b. The input of detectors 16 on line 48 follows the battery voltage as shown in graph B. The reconnect signal (graph C) occurs at time b as a result of charging the capacitor 60. Prior to time b the controller 10 has been in its sleep state and voltage $V_{cc}$ is zero until the reconnect signal is produced (graph D). A short time later, at time c, a reset signal is produced by the voltage supply 14 to initiate the execution of software in the microcomputer 12.

In FIG. 3, again starting in the sleep state, the battery is not disconnected so that the battery signal is constant (graph A) and no reconnect signal is produced (graph C). However, one of the detectors 16 is activated by, say, a door opening or a key operation to impose a low voltage on line 48 at time d (graph B) which turns on transistor 26 to wake up the controller and produce the voltage $V_{cc}$. A short time later, at time e, a reset signal is produced by the voltage supply 14 to initiate the execution of software in the microcomputer 12.

Figure 4:
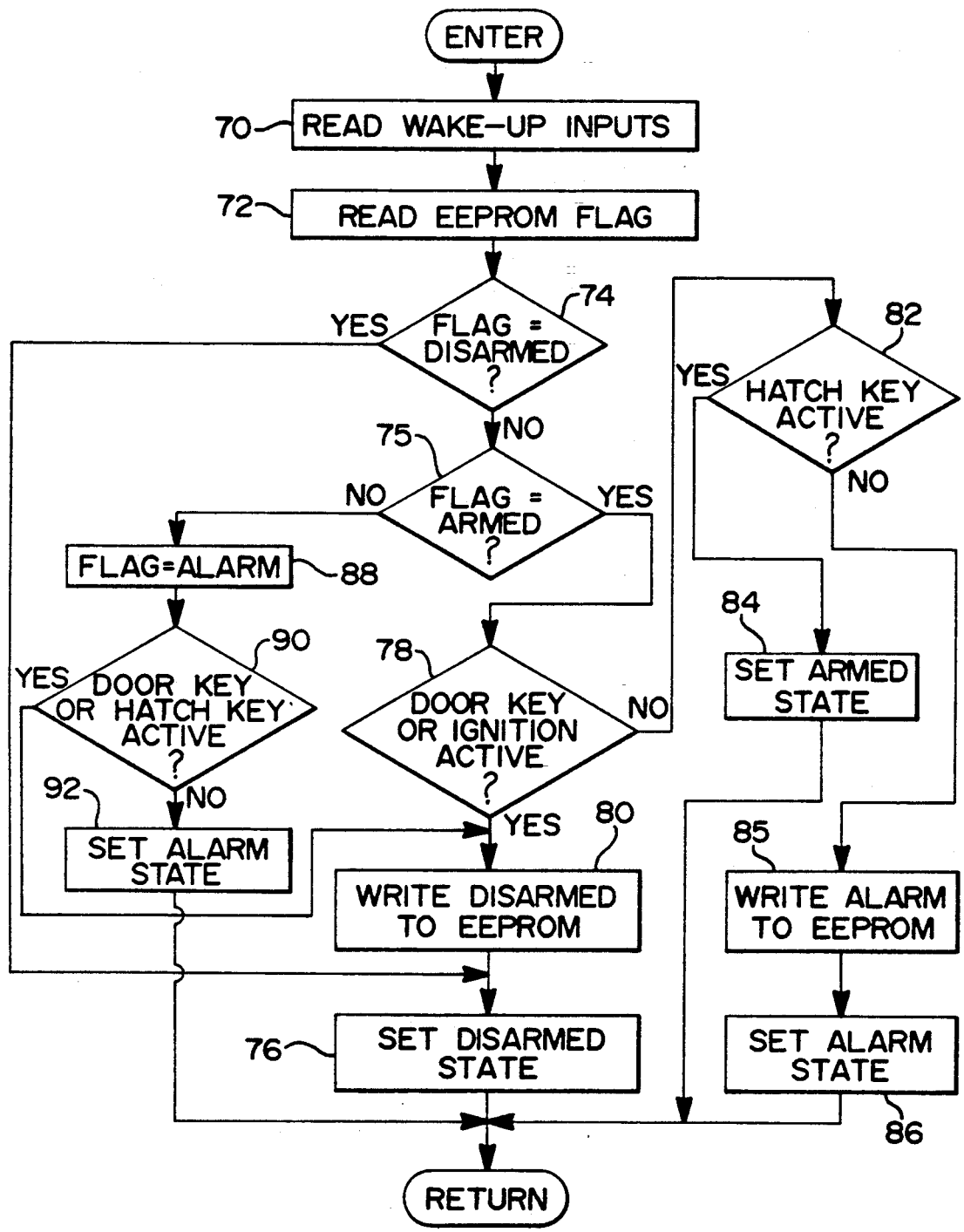
FIG. 4 is a flow chart representing a computer program for controlling the system of FIG. 1, according to the invention.

The controller 12 operates in three mutually exclusive states, disarmed, armed, and alarm. The microcomputer sets the state on the basis of inputs and stores the current state in the EEPROM as a flag. The controller is usually in a sleep mode and when it is awakened it reads the flag in the EEPROM to determine the current state. Depending on the type of activity sensed by the controller, it sets an alarm or returns to sleep mode. The flow chart of FIG. 4 illustrates the program of the microcomputer insofar as it relates to the response to battery reconnect. The function of each block on the chart is referred to by numerals in angle brackets <nn> where the numeral is the reference number of the block.

Upon program initiation, which is caused by the reset signal, the wake-up inputs are read <70>, that is, the inputs on lines 56 are assessed to determine the status of each detector 36-44 and the EEPROM is read to determine which flag is set <72>. If the disarmed flag is set <74>, the disarmed state is set in the controller 10 <76> and the microcomputer returns to other duties until it is set to the sleep mode. The routine of FIG. 4 is not entered again until another wakeup signal is received. If the disarmed flag is not set <74> and the armed flag is set <75>, it is determined whether a door key detector or the ignition circuit is active <78>. If so, it is determined that an authorized user is present with a key and a disarmed flag is written in EEPROM <80> and the controller is set to disarmed state <76>. If neither the door key detector nor the ignition circuit is active <78>, and the hatch key detector is active <82>, the controller is set to armed state <84>. Since the EEPROM armed flag is already set it is not necessary to write to the EEPROM. If the hatch key detector is not active <82>, then it can be concluded that a jamb switch has been closed or the battery reconnect signal has been generated. In either case, an alarm should be given and the alarm flag is written to the EEPROM <85> and the controller is set to the alarm state <86> to sound the alarm 30. It is evident then that the logic will sound an alarm when appropriate as a result of battery reconnect even though the reconnect signal has not been stored or latched for assessment of its status. If the armed flag were not set <75>, then the alarm flag must be set <88> since one of the flags is always set. If the door key detector or the hatch key detector are not active <90>, the alarm state is set <92>, whereas if the door key detector or hatch key detector is active <90>, the vehicle use is authorized and the controller is disarmed and the disarm flag is written to the EEPROM <80>, <76>. It may be noted that the block 90 instruction does not permit ignition circuit operation to override the alarm condition since the ignition switch may be bypassed, particularly since the alarm state has already been set. In any event the battery reconnect will trigger the alarm if the door key or the hatch key is not being used.

It will thus be seen that by providing a reconnect evaluation of the other inputs which are effective to wake up the controller, a determination can be made of whether an alarm state should be set. In general an alarm state will result from a reconnect signal except where a key is operated to override the alarm state. If will be recognized that for a given application the logic may be altered, for example to give either more or less credence to the ignition circuit operation as an indicator of authorized use.

The embodiments of the invention in which an exclusive property or privilege is claimed are defined as follows:

1. A vehicle security system for detecting tampering with a vehicle battery comprising:
   the vehicle battery;
   alarm means;
   a microcomputer based controller normally maintained in an energy conserving sleep state and including wake-up means for arresting the sleep state;
   a circuit coupled o the battery and to the wake-up means for issuing a reconnect signal to activate said wake-up means when a disconnected battery is reconnected;
   a plurality of door status detectors and key operated status detectors each coupled to the wake-up means or activating the wake-up means when a particular condition occurs and further connected to the microcomputer for inputting each condition status;
   a non-volatile memory in the microcomputer for storing either one f an armed flag or an alarm flag; and
   the microcomputer being programmed to asses the status of each condition when the wake-up means is activated and to set an alarm state and energize said alarm means if the armed flag is set and the wakeup means was not activated by any of said door or key status detectors, whereby the alarm means is energized if the battery is reconnected while said armed flag is stored in said memory.

2. The vehicle security system as defined in claim 1 wherein the circuit coupled o the battery comprises a capacitor connected between the battery and the wakeup means or supplying an electrical pulse to the wakeup means when the battery is reconnected.

3. The vehicle security system as defined in claim 1 wherein the microcomputer is further programmed to store the alarm flag when said alarm means is set.

4. The vehicle security system as defined in claim 1 wherein the microcomputer is further programmed to set said alarm means when the alarm flag is set and said key operated detectors are not activated.

5. In a vehicle security system including a controller having a sleep state and having a non-volatile memory, door status detectors, key status detectors, a battery circuit for producing a reconnect pulse when a battery has been disconnected and reconnected, and the controller coupled to each of said door or key status detectors and to the battery circuit for waking by any of said door or key status detector activation, the method of setting an alarm state comprising the steps of:

stepping a disarmed flag, an armed flag or an alarm flag in non-volatile memory according to the status of at least one of said door status and key status detectors;

waking the controller by activating at least one of said door status and key status detectors then assessing the states of the key status detectors and reading the armed flag; and setting said alarm state when the armed flag is set and no key status detector is activated, whereby the battery circuit is effective to wake the controller and cause the alarm state to be set in response to said reconnect pulse.

6. The vehicle security system as defined in claim 5 wherein the key status detectors monitor door keys, hatch keys and an ignition circuit, and including the step of:

setting the alarm state when the alarm flag is set and no key status detector for a door key or hatch key is activated.

* * * * *